Patented Dec. 15, 1936

2,064,558

UNITED STATES PATENT OFFICE 2,064,558

REMOVAL OF SULPHUR COMPOUNDS FROM HYDROCARBONS

Avery A. Morton, Watertown, Mass.

No Drawing. Application October 23, 1933,
Serial No. 694,886

12 Claims. (Cl. 260—169)

This invention relates to the removal of sulphur compounds from hydrocarbons.

The removal of sulphur compounds from hydrocarbons, such as petroleum, has been recognized as a very necessary thing, not only because of the foul odor which many possess, but also because of the corrosion menace which their presence entails. Heretofore sulphuric acid has been the most common reagent for this purpose. But the use of this agent in petroleum is accompanied by considerable waste because the acid also dissolves some unsaturated compounds as well as causes some sulfonation of aromatic constituents. The loss of these unsaturated compounds is poor practice for reasons other than that of a volume loss of gasolene for it is now known that they may possess valuable properties as anti-knock compounds.

In this specification a new reagent is disclosed, namely, an alkali metal reacting with an aromatic hydrocarbon halide in the petroleum. By the use of this reagent the sulphur compounds are attacked with practically little or no loss of other constituents which may be present. In other words a more specific reagent is herein disclosed.

Sodium (as an example of an alkali metal) in the metallic state will not remove the sulphur compounds which are present in petroleum. If, however, the metal is allowed to react with an organic chloride according to the manner of the well known Wurtz reaction, the sodium is rendered active, possibly by the formation of some intermediate compounds, so that the sulphur compounds are readily attacked and converted into insoluble sodium compounds which settle to the bottom as a brownish-black mass. The gasolene may then be distilled directly off from this, with the solid material remaining present, to give a product of good color and odor, of satisfactory gum content, and sulphur of percentage within the prescribed limit. The gasolene may also be drawn off from the solid residue before distillation. Any green color in the product can be avoided or removed very easily by distilling in the presence of a small amount of sodium metal.

The solid residue or precipitate referred to above will, on treatment with water and/or acids, yield sulphur compounds which may be recovered by the customary methods of separation and distillation. By this treatment, therefore, sulphur compounds are not only removed from petroleum but may be obtained as separate products for whatever merit they possess.

The value of these sulphur products, which are largely mercaptans, cannot be estimated at present. Their total quantity would be in the neighborhood of 0.1 to 0.5% of the gasolene produced. The low boiling ones possess a very foul odor. Nevertheless it is a commonplace fact that by-products originally considered entirely worthless, have often developed into worth-while assets. The procedure herein given enables the sulphur compounds to be isolated in quantity never before possible.

In the chemical art the action of sodium on an organic halide is known as the Wurtz or Wurtz-Fittig reaction. For the purposes of this specification these two names will be considered the same and will hereafter be referred to as the Wurtz reaction. By means of this reaction, discovered long ago, the organic chemist is able to unite two molecules together. The discovery claimed here is not that of the Wurtz reaction but rather that in the process of carrying out a small amount of a Wurtz reaction the sodium or alkali metal is rendered active and will attack the sulphur compounds present in the petroleum used as a vehicle. Hence it becomes a means of removing the sulphur compounds present in petroleum.

The equations for the reactions which occur on the sulphur compounds, ignoring the exact nature of the role of the hydrocarbon halide, are:

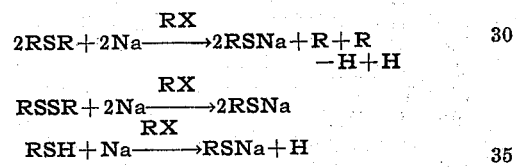

where R stands for any hydrocarbon radical.

As an example of the method, 0.31 pound of sodium, preferably as finely divided as possible, is added to a gallon of cracked distillate which has a sulphur content of 0.8% together with 0.17 pound of p-chlorotoluene. The container is heated to 200° C. for thirty minutes. It is then cooled, opened, and the gasolene containing a flocculent brown precipitate is drawn off through a filter to a still. By distillation, preferably from a small amount (0.01 pound) of finely divided sodium in order to insure a colorless product, a gasolene is obtained which is water white in color, of good odor, low gum content, and less than 0.1% of sulphur. To the unused sodium in the reaction chamber a quantity of fresh metal is added to compensate for the loss during the process, more cracked distillate and p-chlorotoluene are added, and the process is repeated. The suspended matter caught in the filter contains a large proportion of the sulphur compounds as sodium salts which may be decomposed by water and/or acids to give mercaptans.

The amount of p-chlorotoluene used can be reduced by bringing about the removal in two steps. Thus I have found that in the above experiment the same decrease of sulphur can be effected by using in the first step 0.024 pound and in the second treatment 0.020 pound of p-chlorotoluene.

In commercial operation an economical method of carrying out the process would be to cause the gasolene to pass through two or more heated chambers containing sodium sand. When the sodium in a container becomes exhausted it can be removed and replaced with fresh metal. The danger of the small particles of sodium sand coalescing at the temperatures used is nil presumably because of the formation of a surface film on the metal. Proper arrangement would demand, of course, that the container, having the sodium most nearly spent, be the first in the series.

Another method which may be employed in carrying out the process is to distill the gasolene through a high boiling, non-reactive oil or petroleum fraction containing the sodium sand in suspension. The chloro compound, in quantity similar to that given in the previous illustration is added to the oil as the gasolene is distilled through the mixture. The admission of the halide may very properly be regulated to accord with the sulphur content of the vapors.

Another method is to distill the gasolene slowly from off the sodium sand in the presence of the halide. Obviously the lower boiling fractions have a shorter time of contact than the higher boiling ones, a fact which is compensated for partly by the lower suphur content usually present in these portions. If necessary to complete the reaction a period of refluxing may precede the distillation.

Still another method of carrying out the process is to allow the sodium to react with the organic halide in some other medium such as a non-reactive hydrocarbon or the chloride itself. The insoluble products from this reaction, containing a considerable percentage of the active form or compound of the metal, may then be separated by decantation or filtration and be contacted with the crude hydrocarbon containing the sulphur compounds. This method is not ordinarily as good as allowing the reaction to take place in situ.

Certain savings of time and material are available.

Thus, the metal should be as finely divided as possible, in order to have the maximum amount of surface exposed. Such division may be secured by the customary method of making sodium sand in the laboratory, which consists of melting the metal under a hydrocarbon liquid whose boiling point is higher than the melting point of sodium (sodium melts at 97° C.), agitating violently in order to break the metal into fine pieces, and then cooling by dousing it into enough of the cold hydrocarbon liquid to chill the metal below the point where the small pieces would coalesce.

A preliminary drying of the petroleum with caustic soda or with lime is also advantageous to avoid any waste of the more expensive sodium. That is to say, the presence of a small amount of moisture in the crude gasolene, while not preventing the reaction with the sulphur compounds, does divert some of the sodium into another reaction.

Para chlorotoluene has been given merely as an example of a hydrocarbon containing a halogen atom which will react with sodium under these conditions. Other aromatic halogen containing compounds which have been found to give results are chlorobenzene, α-chloronaphthalene, p-chlorodiphenyl also the aliphatic compound amyl chloride. Some advantage may be derived from the use of chlorides which have a high boiling point, since, upon distillation, traces of the halogen compound would not come over to contaminate the distillate. It is possible also to use bromides and iodines, but for reasons of economy the chlorides would usually be preferred; and the presence of these in the hydrocarbon may be obtained by any suitable method, one such being by passing gaseous chlorine directly into cracked distillate or unrefined petroleum until the desired concentration has been reached.

Other alkali metals, such as potassium and lithium, behave in a manner similar to sodium; and hence for the purpose of this patent are considered equivalents. For practical purposes sodium will be used because of its cheapness.

The process is applicable not only to cracked distillate but also to other petroleum fractions such as kerosene and lubricating oils. From all of these the sulphur compounds may be separated as sodium salts by decantation or filtration; after which, treatment with water and/or acid liberates the free sulphur compounds. Distillation in the presence of the sodium salt is not always possible in the case of these higher fractions because of the danger of decomposing it into hydrogen sulphide, sodium sulphide and a hydrocarbon.

I claim as my invention:

1. A process of refining hydrocarbons which comprises the causing of an alkali metal to react with an aromatic hydrocarbon halogen compound in the midst of the hydrocarbon which is to be refined.

2. A process for the removal of sulphur compounds from hydrocarbons by causing a reaction of an alkali metal with an aromatic hydrocarbon halide therein, and a reaction of the product thereof with the said sulphur compounds, and separating the hydrocarbon from the product of the second said reaction.

3. A process for the isolation of sulphur compounds from hydrocarbons which includes the causing of an alkali metal to react with an aromatic hydrocarbon chloride in the hydrocarbon, separating the alkali product formed by the various reactions then occurring, and treating the said poduct to recover the sulphur compound.

4. A process for the removal of sulphur compounds from hydrocarbons by contacting the hydrocarbon containing them as impurities with the initial products of the reaction of an alkali metal with an aromatic hydrocarbon halide.

5. A process for the removal of sulphur compounds from hydrocarbons by contacting the hydrocarbon containing them as impurities with the initial products of the reaction of sodium with an aromatic hydrocarbon chloride.

6. A process for promoting a reaction between sodium and organic sulphur compounds present in petroleum by the initial reaction of sodium with an aromatic hydrocarbon halide therein.

7. A process of refining hydrocarbons which comprises the causing of an alkali metal to react with chlorides of aromatic hydrocarbons, the hydrocarbon which is to be refined being the vehicle carrying the substances between which the refining reactions occur.

8. A process for the removal of sulphur in the refining of petroleum, comprising the subjecting of the petroleum to ingredients which might initiate a Wurtz reaction, such as a hydrocarbon halide, an alkyl halide, and an alkali metal, by whose reaction the alkali metal is activated to combine with sulphur in the petroleum.

9. A process for the refining of liquid petroleum products which includes the having of sodium in contact with the liquid that is to be refined, and then introducing thereto a hydrocarbon halogen compound, whereby the sodium is activated to remove sulphur compounds.

10. A process for the removal of sulphur compounds from hydrocarbons by causing to take place, within a liquid body of the hydrocarbon from which the sulphur is to be removed, a reaction of an alkali metal with a hydrocarbon halide introduced into the said liquid body, and immediately also therein a reaction, with the sulphur compounds therein, of the product of the first mentioned reaction; and separating the hydrocarbons from the product of the second said reaction.

11. A process of refining hydrocarbons which comprises the causing of an alkali metal to react with an aromatic hydrocarbon halogen compound while intermixed with the hydrocarbon which is to be refined, whereby the alkali metal combines with sulphur; removing from the liquid this resulting combination; the first mentioned reaction being effected in two separate and similar steps, in each of which the quantity of halogen hydrocarbon used is substantially less than half of the amount of the same requisite for performing the same reaction to obtain substantially the same decrease of sulphur.

12. A process for the removal of sulphur compounds from cracked petroleum distillate which comprises the introducing of finely divided sodium and p-chlorotoluene together in the cracked distillate, in the proportions approximately of a third of a pound of sodium and a sixth of a pound of p-chlorotoluene per gallon of cracked distillate; letting reaction proceed of activated sodium with the sulphur content of the distillate with formation of a precipitate; and separating the precipitate from the distillate.

AVERY A. MORTON.